(12) United States Patent
Fileman et al.

(10) Patent No.: US 6,263,674 B1
(45) Date of Patent: Jul. 24, 2001

(54) SOLAR-POWERED, MOBILE VENDING APPARATUS

(76) Inventors: Stephen Fileman; Shelly Fileman, both of 2138 Willoughby St., Port Charlotte, FL (US) 33980

( * ) Notice: Subject to any disclaimer, the term of this patent is extended or adjusted under 35 U.S.C. 154(b) by 0 days.

(21) Appl. No.: 09/662,670

(22) Filed: Sep. 15, 2000

(51) Int. Cl.[7] ...................................................... F03G 6/00
(52) U.S. Cl. ...................... 60/641.9; 60/641.8; 60/641.15
(58) Field of Search ............................ 60/641.8, 641.9, 60/641.15

(56) References Cited

U.S. PATENT DOCUMENTS

| | | | |
|---|---|---|---|
| D. 290,438 | * | 6/1987 | Mandat .................................... D7/58 |
| D. 340,336 | * | 10/1993 | Groenewege et al. ................. D34/20 |
| D. 365,906 | * | 1/1996 | Lee ......................................... D34/20 |
| D. 398,432 | * | 9/1998 | Yerkes .................................... D34/20 |
| 4,602,694 | * | 7/1986 | Weldin .................................... 180/2.2 |
| 4,651,080 | * | 3/1987 | Wallace .................................. 180/2.2 |
| 4,744,430 | * | 5/1988 | McCoy ................................... 180/2.2 |
| 5,385,275 | * | 1/1995 | Billet ...................................... 222/399 |
| 5,529,220 | * | 6/1996 | Credle, Jr. et al. ................... 222/175 |
| 5,529,307 | * | 6/1996 | Chang .................................... 473/136 |
| 5,772,075 | * | 6/1998 | Ash, Jr. et al. ........................ 222/1 |
| 6,062,029 | * | 5/2000 | Doe ...................................... 60/641.15 |

\* cited by examiner

*Primary Examiner*—Hoang Nguyen
(74) *Attorney, Agent, or Firm*—John D. Gugliotta

(57) ABSTRACT

A vending apparatus is provided having a vending machine powered by a solar photovoltaic cell array of panels. The panels are secured in a horizontal position to a base and mounted to a top of the vending machine for converting solar energy to electrical energy for powering the vending apparatus.

10 Claims, 3 Drawing Sheets

SOLAR-POWERED, MOBILE VENDING APPARATUS

RELATED APPLICATIONS

The present invention was first described in Disclosure Document No. 476,183 filed on Jun. 26, 2000. There are no previously filed, nor currently any co-pending applications, anywhere in the world.

BACKGROUND OF THE INVENTION

1. Field of the Invention

The present invention relates generally to vending devices and, more particularly, to a solar-powered, mobile vending apparatus.

2. Description of the Related Art

Vending machines provide food and other products at points of consumption which are convenient for the consumer and economically advantageous for the machine owner. They can be found in stores, office buildings, schools, factories, and similar locations all over the world. One common point to all of these locations however, is the availability of electrical power to operate these machines. This fact eliminates the possibility of vending machines operating outside at locations far from electrical power. Ironically, these locations, such as fairs, carnivals, outside concerts, and the like are the locations where vending machine products are most likely needed.

Accordingly, there exists a need for a means by which vending machines can operate in areas without electrical power, and can be set up and removed in a timely manner. The development of the solar-powered, mobile vending apparatus fulfills this need.

A search of the prior art did not disclose any patents that read directly on the claims of the instant invention; however, the following references were considered related. The following patents disclose a portable slush-beverage dispensing system: U.S. Pat. No. 5,772,075 issued in the name of Ash, Jr. et al.; U.S. Pat. No. 5,385,275 issued in the name of Billet.

U.S. Pat. No. 6,062,029 issued in the name of Doe describes an optical solar electric generator.

U.S. Pat. No. 5,529,307 issued in the name of Chang discloses a solar-powered automatic golf ball dispenser.

U.S. Pat. No. 5,529,220 issued in the name of Credle, Jr. et al. describes a backpack beverage dispenser.

U.S. Pat. No. 4,744,430 issued in the name of McCoy discloses a solar-powered golf cart.

U.S. Pat. No. D 398,432 issued in the name of Yerkes describes the ornamental design for a transportable vending cart.

U.S. Pat. No. D 365,906 issued in the name of Lee discloses the ornamental design for an electronic flower cart kiosk.

U.S. Pat. No. D 340,336 issued in the name of Groenewege et al. describes the ornamental design for a mobile bar.

U.S. Pat. No. D 290,438 issued in the name of Mandat discloses the ornamental design for a portable nachos vending unit.

Consequently, a need has been felt for providing a device which allows for the vending of food products at virtually any location in a quick, simple and effortless manner without the requirement of commercial electric power.

SUMMARY OF THE INVENTION

Therefore, it is an object of the present invention to provide a portable vending machine which is mounted on a utility trailer.

It is another object of the present invention to provide a device which can be towed to any location quickly and provides food and other items where they are needed.

It is still another object of the present invention to provide a device which allows for quick setup and removal.

It is still another object of the present invention to provide a device which utilizes solar photovoltaic cells for providing electrical power to the vending machine.

It is still another object of the present invention to provide a device which uses a battery charger and rechargeable batteries for operation during periods of reduced light.

It is another object of the present invention to provide a device using photovoltaic cells which are mounted on top of the vending machine.

It is another object of the present invention to provide a device which operates the vending machine through an electrical inverter.

It is another object of the present invention to provide a device which reduces pollution and conserves vital natural resources.

It is another object of the present invention to provide a device which is great for periodic outside events such as fairs, carnivals, outside concerts, and parks.

It is another object of the present invention to provide a device which is ideal anywhere electrical power is not available.

Briefly described according to one embodiment of the present invention, a solar-powered, mobile vending apparatus is provided for dispensing and vending food, beverages and other products in areas where commercial power is not readily available. A conventional vending machine or group of machines is mounted on a trailer. The top of the machine is covered with solar photovoltaic cells which feed DC power to a battery charger which keeps a set of rechargeable batteries at full capacity. The batteries in turn supply power to an inverter which creates AC power to run the vending machine. In such a manner, vending services can be provided on a temporary basis where commercial power is not readily available such as outside locations at fairs, gatherings, parks, concerts, and the like.

The use of the present invention allows for the vending of food products at virtually any location in a quick, simple and effortless manner without the requirement of commercial electric power.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
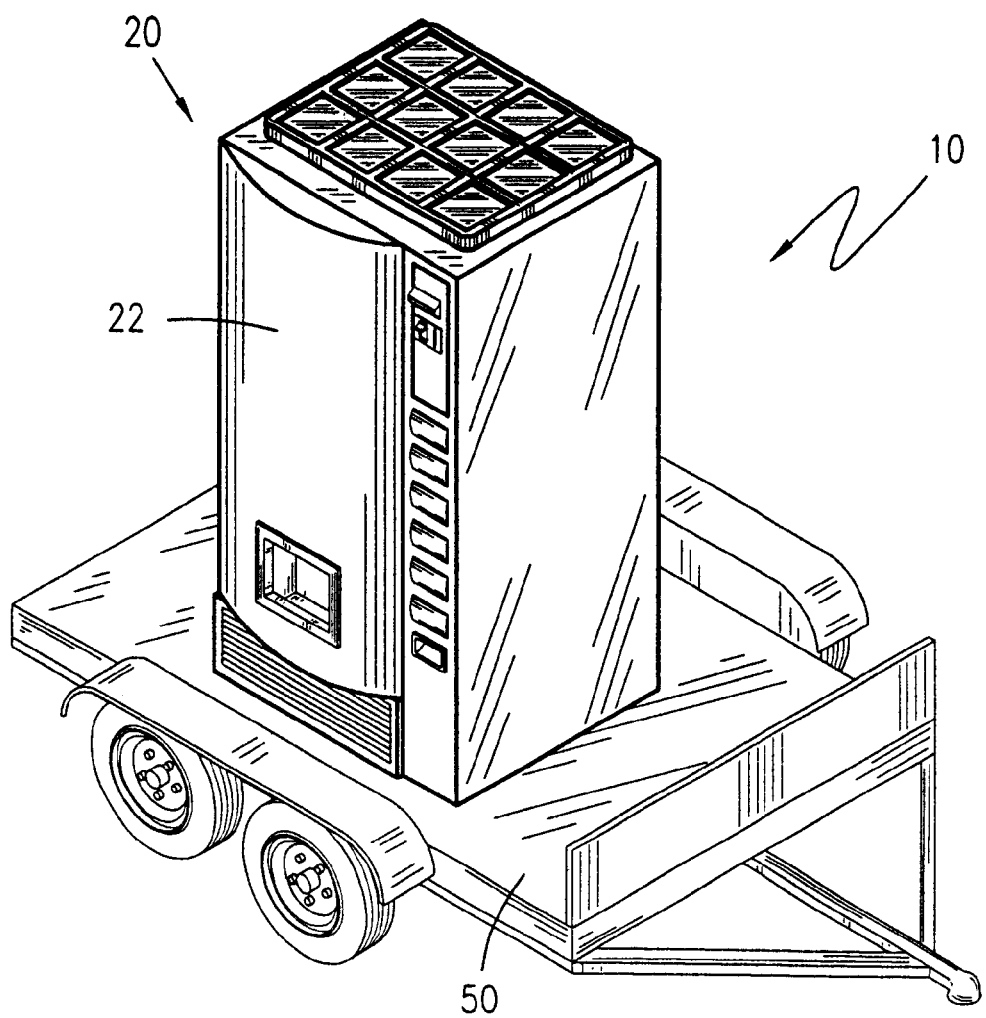
FIG. 1 is a perspective view of a solar-powered, mobile vending apparatus according to the preferred embodiment of the present invention.
Figure 4:
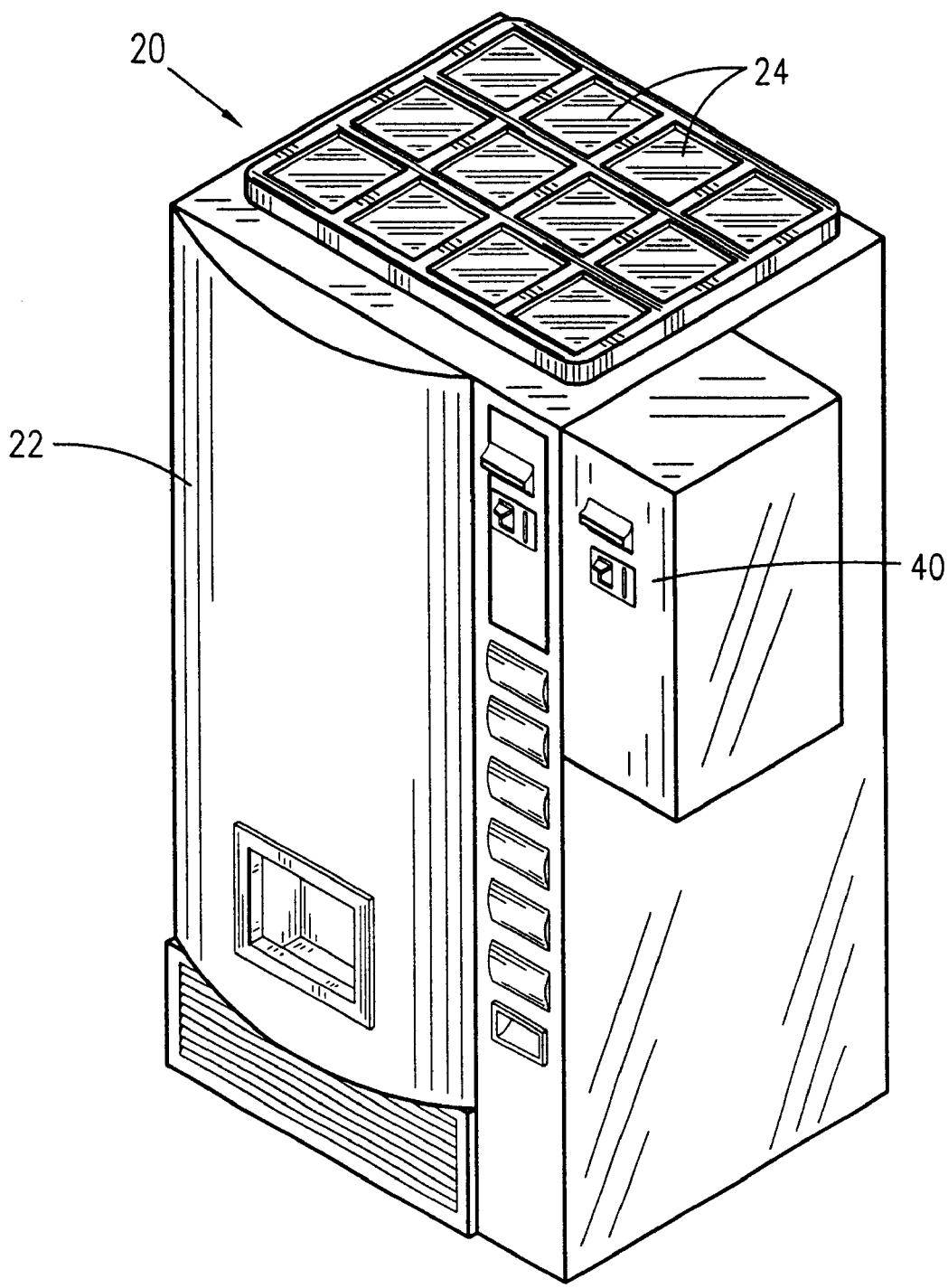
FIG. 4 is a perspective view of the vending machine with a change machine attached thereto according to the preferred embodiment of the present invention.

Referring now to FIGS. 1 and 4, a solar-powered, mobile vending apparatus 10 is shown, according to the present invention, comprised of a mobile, trailer mounted, solar powered vending machine 20 for dispensing and vending food, beverages and other products in areas where commercial power is not readily available.

The vending machine 20 is of a generally elongated rectangular, configuration constructed of a lightweight metal material of high strength such as rigid aluminum. The vending machine 20 includes an internal housing 22 configured so as to provide a storage bin for the vending products until dispensed. It is envisioned that the present invention has dimensions measuring the size of a typical vending machine.

Figure 2:
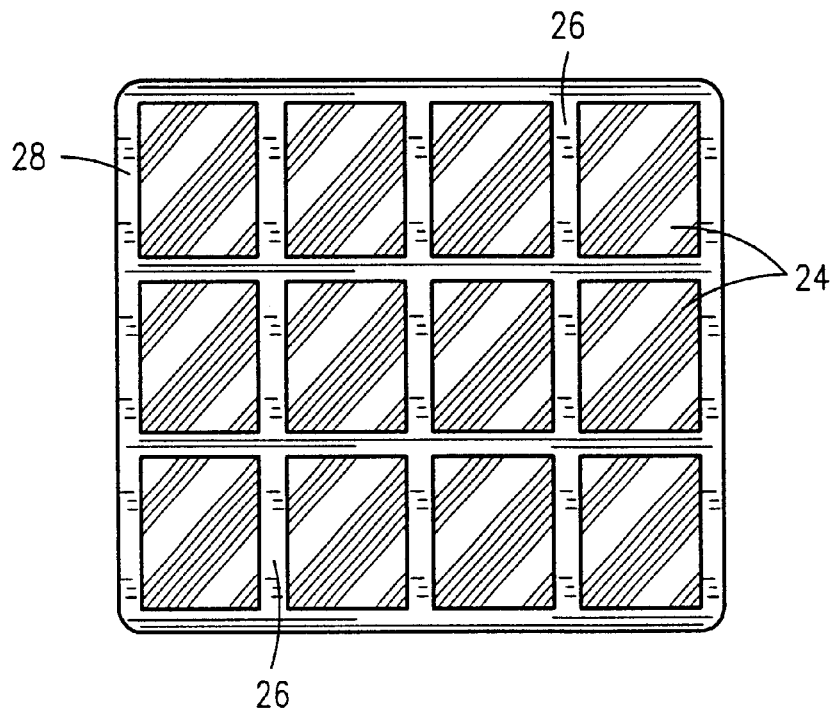
FIG. 2 is a top plan view of the solar photovoltaic cell array of panels according to the preferred embodiment of the present invention.

Referring now to FIG. 2, solar energy for powering the solar-powered, mobile vending apparatus 10 is provided via a solar photovoltaic cell array of panels 24 secured in a horizontal position to a base, such as acrylic canvas, mounted to a top of the vending machine 20. The solar panels 24 are of a size so as to provide the required power and voltage for running the vending machine 20. The solar panels 24 are mechanically connected into the array by narrow bands 26 which extend between the solar panels 24, and a peripherally aligned margin 28 which circumvents the entire array of solar panels 24. The narrow bands 26 and the margin 28 are secured to the base by a suitable adhesive. The mounting arrangement and mechanical connection of the solar panels 24 are only meant as a suggestion and are in no way limiting.

Figure 3:
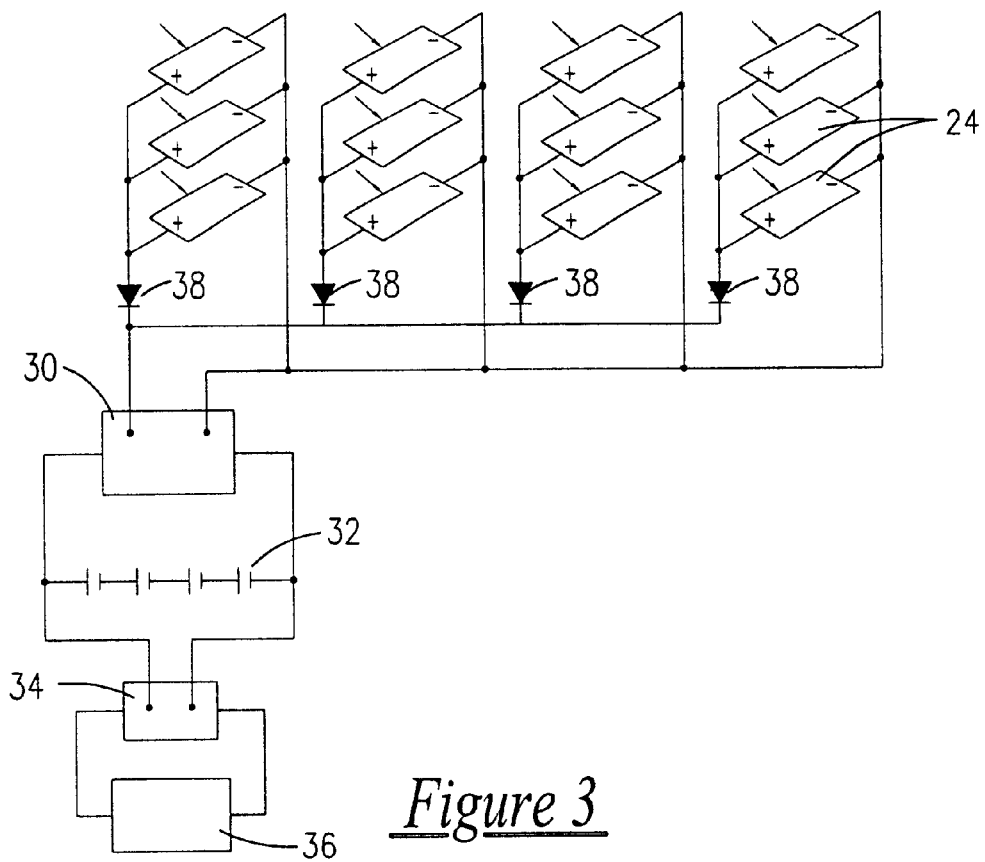
FIG. 3 is a schematic diagram of the solar and electrical arrangement of the preferred embodiment of the present invention.

Referring now in greater detail to FIG. 3, the solar panels 24 are shown connected to terminals of a battery charger 30 which receives DC power from the solar panels 24. The battery charger 30 is connected to a plurality of rechargeable batteries 32 so as to maintain the batteries 32 at full capacity. The plurality of batteries 32 in turn are connected to an inverter 34 which creates AC power for running the vending machine 20. The size and type of inverter 34 utilized in the present invention would be of the type suitable for handling the maximum load drawn thereby. Functioning as a generator, the inverter 34 operates silently and also functions ideally for components drawing substantial power, such as refrigerators. Finally, the inverter 34 is connected to a motor 36 of the vending machine 20.

Each group of solar panels 24 has a diode 38 connected between it and the battery charger 30 for permitting current flow from the solar panels 24 to the battery charger 30 and for preventing current flow in an opposite direction.

In the presence of adequate insolation, the solar panels 24 supply DC power to the battery charger 30 which maintains the batteries 32 at full capacity. During periods when insolation is inadequate for the solar panels 24 to supply DC power to the battery charger 30, the vending machine 20 will continue to operate for an extended but limited amount of time by power transferred from the plurality of rechargeable batteries 32 which received constant recharging during an immediate prior period of sufficient insolation, thereby allowing the batteries 32 to have maintained full power. Being powered by solar energy, the present invention provides a device which not only reduces pollution, but also conserves vital natural resources.

Referring now to FIG. 4, the vending machine 20 further includes an attachable change machine 40 for converting various bill denominations into change as a convenience to users. The change machine 40 is shown attached to an upper lateral sidewall of the vending machine 20.

The present invention is mounted to a utility trailer 50, thereby allowing the solar-powered, mobile vending apparatus 10 to be towed quickly to any location, making it ideal for outdoor events including but not limited to fairs, carnivals, outside concerts, and parks. Being easily transported, the solarpowered, mobile vending apparatus 10 also provides a portable device which allows quick setup and removal from a site.

2. Operation of the Preferred Embodiment

To use the present invention, transport the mounted apparatus via the utility trailer 50 to a desired outdoor event or environment. Users simply use the device as they would any other typical vending machine. Users insert change into the vending machine 20 to receive a desired food or beverage. In the event a user is without change, the present invention includes a change machine 40 for converting various bill denominations into change. The solar photovoltaic cell array of panels 24 provides electrical power to the present invention allowing it to operate in remote areas where commercial power is not readily available.

The use of the present invention allows for the vending of food products at virtually any location in a quick, simple and effortless manner without the requirement of commercial electric power.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A food vending apparatus comprising:
   a vending machine includes an internal housing configured so as to provide a storage bin for the vending products until dispensed;
   a solar photovoltaic cell array of panels secured in a horizontal position to a base and mounted to a top of said vending machine for converting solar energy to electrical energy for powering said vending apparatus.

2. The vending apparatus of claim 1, wherein said solar panels are mechanically connected into the array by narrow bands which extend between the solar panels, and a peripherally aligned margin which circumscribes the entire array of solar panels, said narrow bands and said margin secured to said base by an adhesive.

3. The vending apparatus of claim 1, further comprising a battery charger which receives DC power from said solar panels, said battery charger connected to a plurality of rechargeable batteries so as to maintain said batteries at full electrical capacity.

4. The vending apparatus of claim 3, further comprising an inverter which creates AC power for running said vending machine.

5. The vending apparatus of claim 3, wherein each group of solar panels further comprises a diode connected between it and said battery charger for permitting current flow from the solar panels to the battery charger and for preventing current flow in an opposite direction.

6. The vending apparatus of claim 1, further comprising an attachable change machine for converting various bill denominations into change.

7. The vending apparatus of claim 1, further comprising a utility trailer upon which said vending machine is mounted, thereby allowing said vending apparatus to be towed.

8. In an otherwise conventional vending machine of the type for dispensing and vending food, beverages and similar types of products, and having an internal housing configured so as to provide a storage bin for the vending products until dispensed, wherein the improvement comprises:

a solar photovoltaic cell array of panels secured in a horizontal position to a base and mounted to a top of said vending machine for converting solar energy to electrical energy for powering said vending apparatus.

9. In an otherwise conventional vending machine of the type for dispensing and vending food, beverages and similar types of products, and having an internal housing configured so as to provide a storage bin for the vending products until dispensed, wherein the improvement comprises:

a solar photovoltaic cell array of panels secured in a horizontal position to a base and mounted to a top of said vending machine for converting solar energy to electrical energy for powering said vending apparatus; in combination with a utility trailer upon which said vending machine is mounted, thereby allowing said vending apparatus to be towed.

10. In the vending apparatus of claim 9, wherein the improvement further comprises an attachable change machine for converting various bill denominations into change.

* * * * *